United States Patent
Alfano et al.

(10) Patent No.: US 8,346,268 B2
(45) Date of Patent: Jan. 1, 2013

(54) NETWORK CONTROLLED MOBILITY ROUTE OPTIMIZATION FOR AN IP BASE STATION TRANSCEIVER ARCHITECTURE

(75) Inventors: Frank M. Alfano, Wheaton, IL (US);
Peter Bosch, New Providence, NJ (US);
Peter J. McCann, Naperville, IL (US);
Patrick J. Walsh, Naperville, IL (US)

(73) Assignee: Alcatel Lucent, Paris (FR)

( * ) Notice: Subject to any disclaimer, the term of this patent is extended or adjusted under 35 U.S.C. 154(b) by 914 days.

(21) Appl. No.: 11/602,543

(22) Filed: Nov. 20, 2006

(65) Prior Publication Data

US 2008/0117845 A1    May 22, 2008

(51) Int. Cl.
*H04W 40/00*    (2009.01)
(52) U.S. Cl. .................... 455/445; 455/560; 370/349
(58) Field of Classification Search .................. 455/445; 370/310, 349, 238
See application file for complete search history.

(56) References Cited

U.S. PATENT DOCUMENTS

| | | | |
|---|---|---|---|
| 7,653,414 B2* | 1/2010 | Pan ............................... | 455/560 |
| 7,821,995 B2 | 10/2010 | Das et al. | |
| 2002/0009066 A1 | 1/2002 | Shimizu et al. | |
| 2005/0259631 A1 | 11/2005 | Rajahalme | |
| 2007/0242628 A1* | 10/2007 | Dutta et al. .................... | 370/310 |
| 2009/0141686 A1 | 6/2009 | Funabiki et al. | |

OTHER PUBLICATIONS

Govind Krishnamurthi, Hemant Chaskar, Ritva Siren, "Providing End-to-End Location Privacy in IP-Based Mobile Communication", IEEE Communication Society, Mar. 2004.*
D. Johnson, C Perkins, J. Arkko, RFC 3775 Mobility Support in IPv6, Jun. 2004.*
Krishnamurthi, G. et al.; Providing End-to-End Location Privacy in IP-Based Mobile Communication; Wireless Communications and Networking Conference, 2004; Mar. 21, 2004; pp. 1264-1269; vol. 2; WCNC. 2004 IEEE Atlanta, GA USA.
Kagalkar, A. et al.; PPP Migration: A Technique for Low-Latency Handoff in CDMA2000 Networks; Mobile and Ubiquitous Systems: Networking and Services, 2005.; Jul. 17, 2005; pp. 133-144; The Second Annual International Conference on San Diego, CA, USA IEEEE.

* cited by examiner

*Primary Examiner* — Vladimir Magloire
(74) *Attorney, Agent, or Firm* — Carmen Patti Law Group, LLC

(57) ABSTRACT

A method in one example has: establishing communication between two mobile terminals in a base station routing architecture network; and optimizing routing between the two mobiles terminals without requiring all traffic to traverse an anchor point in the base station routing architecture network. An IP base station transceiver architecture utilizes network controlled mobility to provide a transparent connection between a mobile terminal and an anchor point in the network. This transparency hides the mobility associated with changing IP base station transceivers from the mobile terminal and reduces over-the-air signaling.

14 Claims, 2 Drawing Sheets

NETWORK CONTROLLED MOBILITY ROUTE OPTIMIZATION FOR AN IP BASE STATION TRANSCEIVER ARCHITECTURE

TECHNICAL FIELD

The invention relates generally to telecommunication systems and, more specifically, to a system that provides an optimized data path for real time mobile-to-mobile calls in an IP Base Station Transceiver (IP-BTS e.g. BSR (Base Station Router)) architecture.

BACKGROUND

The following is an overview of Mobile IPv6 basic operation. A mobile node (MN) is always expected to be addressable at its home address, whether it is currently attached to its home link or is away from home. The "home address" is an IP address that is routeable to the mobile nodes home subnet and is assigned to the mobile node. While a mobile node is at home, packets addressed to its home address are routed to the mobile node's home link, using conventional Internet routing mechanisms.

While a mobile node is attached to some foreign link away from home, it is also addressable at one or more care-of addresses. A care-of address is an IP address associated with a mobile node that has the subnet prefix of a particular foreign link on which the mobile node can be reached. The mobile node can acquire its care-of address through conventional IPv6 mechanisms, such as stateless or stateful auto-configuration. As long as the mobile node stays in this location, packets addressed to this care-of address will be routed to the mobile node. The mobile node may also accept packets from several care-of addresses, such as when it is moving but still reachable at the previous link.

The association between a mobile node's home address and care-of address is known as a "binding" for the mobile node. While away from home, a mobile node registers its primary care-of address with a router on its home link, requesting this router to function as the "home agent" for the mobile node. The mobile node performs this binding registration by sending a "Binding Update" message to the home agent. The home agent replies to the mobile node by returning a "Binding Acknowledgement" message.

Any node communicating with a mobile node is referred to in this document as a "correspondent node" of the mobile node, and may itself be either a stationary node or a mobile node. Mobile nodes can provide information about their current location to correspondent nodes. This happens through a registration with the correspondent node and is referred to as route optimization. As a part of this procedure, a return routability test is performed in order to authorize the establishment of the binding. There are two possible modes for communications between the mobile node and a correspondent node. The first mode, bidirectional tunneling, does not require Mobile IPv6 support from the correspondent node and is available even if the mobile node has not registered its current binding with the correspondent node. Packets from the correspondent node are routed to the home agent and then tunneled to the mobile node. Packets to the correspondent node are tunneled from the mobile node to the home agent ("reverse tunneled") and then routed normally from the home network to the correspondent node. In this mode, the home agent intercepts any IPv6 packets addressed to the mobile node's home address (or home addresses) on the home link. Each intercepted packet is tunneled to the mobile node's primary care-of address. This tunneling is performed using IPv6 encapsulation.

The second mode, "route optimization", requires the mobile node to register its current care-of-address with the MIPv6 capable correspondent node. Packets from the correspondent node can be routed directly to the care-of address of the mobile node. When sending a packet to any IPv6 destination, the correspondent node checks its cached bindings for an entry for the packet's destination address. If a cached binding for this destination address is found, the node uses a new type of IPv6 routing header to route the packet to the mobile node by way of the care-of address indicated in this binding.

Routing packets directly to the mobile node's care-of address allows the shortest communications path to be used. It also eliminates congestion at the mobile node's home agent and home link. In addition, the impact of any possible failure of the home agent or networks on the path to or from it is reduced. When routing packets directly to the mobile node, the correspondent node sets the Destination Address in the IPv6 header to the care-of address of the mobile node. A new type of IPv6 routing header is also added to the packet to carry the desired home address. Similarly, when sending packets to the correspondent node, the mobile node sets the Source Address in the packet's IPv6 header to its current care-of addresses. The mobile node adds a new IPv6 "Home Address" destination option to carry its home address. The inclusion of home addresses in these packets makes the use of the care-of address transparent above the network layer (e.g., at the transport layer). Mobile IPv6 also provides support for multiple home agents, and a limited support for the reconfiguration of the home network. In these cases, the mobile node may not know the IP address of its own home agent, and even the home subnet prefixes may change over time.

A mechanism, known as "dynamic home agent address discovery" allows a mobile node to dynamically discover the IP address of a home agent on its home link, even when the mobile node is away from home. Mobile nodes can also learn new information about home subnet prefixes through the "mobile prefix discovery" mechanism.

There have been other proposals that rely on the IP-BTS to detect and initiate the route optimization procedure using a HoT/i/CoT/i/message sequence. However, these proposals require significantly more signaling to establish the binding update. The HoT/i/CoT/i/message sequence defined in RFC3775 is intended to operate between nodes that may not have a security relationship. This message sequence provides integrity and authenticity protection of the binding update messages.

Thus, there is a need in the art for a system that provides for an improved and more efficient system for mobile-to-mobile communication, especially in a base station routing architecture network.

SUMMARY

One embodiment of the present method and apparatus encompasses an apparatus. This embodiment of the apparatus may comprise: means for establishing communication between two mobile terminals in a base station routing architecture network; and means for optimizing routing between the two mobiles terminals without requiring all traffic to traverse an anchor point in the base station routing architecture network.

Another embodiment of the present method and apparatus encompasses a method. This embodiment of the method may comprise: establishing communication between two mobile terminals in a base station routing architecture network; and optimizing routing between the two mobiles terminals without requiring all traffic to traverse an anchor point in the base station routing architecture network.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Figure 1:
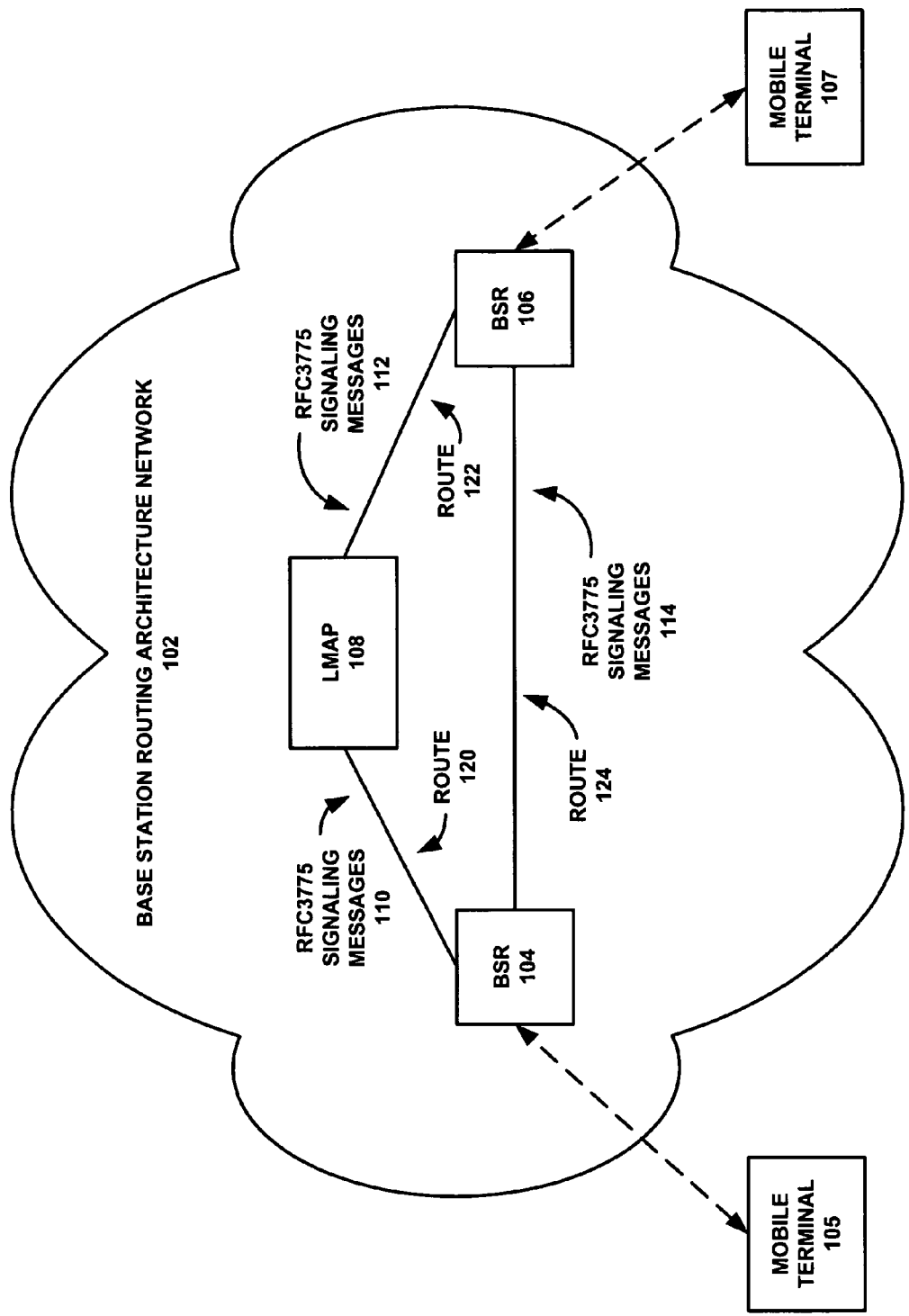
FIG. 1 depicts an embodiment according to the present apparatus.

The flat IP-BTS architecture utilizes network controlled mobility to provide a transparent connection between the mobile station (MS) and an anchor point or Home Agent (HA) in the network. This transparency hides the mobility associated with changing IP-BTSs from the MS and reduces over-the-air signaling.

However, this means that all bearer traffic will traverse the anchor point. This is inefficient if both mobiles in a mobile-to-mobile call are located in a common sub-domain. Even though the mobile sees a single-hop link layer connection to the network anchor point (HA), it is desirable to provide optimized routing between two mobiles without requiring all traffic to traverse the anchor point (HA) which may be located in a regional or centralized location.

The IP-BTS minimizes network complexity, thus permitting, for example, a distributed 4G-type architecture in a 3G environment. The IP-BTS encapsulates the functionality of Node B, RNC, and IP gateway (eg. SGSN and GGSN, or PDSN) in one physical element effectively providing a IP based wireless access point to the internet. Traditional networks and the IP-BTS can co-exist providing a seamless user experience that is enhanced when the terminal is in BSR coverage. The BSR value proposition addresses the challenge of minimizing the capex and opex implications of significant increase in mobile high-speed data subscriber rates, at the same time enabling seamless wireless service provision, including stable, high-quality in-building coverage. Conventional UMTS and cdma2000 network architectures are inherently hierarchical, with radio traffic processed through multiple elements that include the RNC, SGSN and GGSN or PDSN. The BSR for example takes these multiple network elements and integrates their collective functionality into a single edge node.

Embodiments according to the present method and apparatus utilize existing RFC3775 signaling messages to create an optimized routing tunnel between two mobiles. These embodiments minimize requirements for security associations, eliminate over-the-air signaling and minimize the number of messages required to establish the optimized data path. In addition embodiments of the present method provide for a mechanism for removing tunnels due to MS movement. RFC3775 signaling messages are utilized for mobility support in IPv6.

Embodiments according to the present method and apparatus provide a route optimized data path for mobile-to-mobile communications. This is important for latency sensitive applications such as VoIP.

In general, embodiments according to the present method and apparatus operate by having the HA detect intra-HA traffic and then initiate a binding update procedure to establish a direct routing path between BSRs eliminating the need to tunnel all traffic through the HA.

Instead of having the mobile point of attachments (MPAs) detect and initiate MIP6 routing optimization (RO) between the MPAs, the HA may detect and initiate the RO. This eliminates the need for shared keys between the MPAs or the need to run the HOT/i/CoT/i/message sequence. Only the MPA and HA will need a shared key which is a given.

As an example:

HA1 ------------- MPA1 (BSR1) ---------- MN1
\------------- MPA2 (BSR2) ---------- MN2

HA detects MN1 to MN2 packet (or MN2 to MN1)

+ HA sends binding information to MPA1 giving MPA1 address of MPA2 for MN2

+ HA sends binding information to MPA2 giving MPA2 address of MPA1 for MN1

If control of RO is desired this may be accomplished at the HA. This may also be extended to inter-HAs. For example:

HA1 ------------- MPA1 ---------- MN1
HA2 ------------- MPA2 ---------- MN2

If the HAs know each others network prefix, then either HA could detect an inter-HA packet. HA1 detects MN1 to MN2 packet (or MN2 to MN1)

+ HA1 sends binding information to HA2 giving HA2 address of MPA1 for MN1+MPA2 sends binding information to MPA2 giving MPA2 address of MPA1 for MN1. Repeat for other direction.

Although some known systems rely on the MPAs to detect and initiate the route optimization procedure using the HoT/i/CoT/i/message sequence, these proposals require significantly more signaling to establish the binding update. The HoT/i/CoT/i/message sequence defined in RFC3775 is intended to operate between nodes that may not have a security relationship. This sequence provides integrity and authenticity protection of the binding update messages.

In embodiments according to the present method and apparatus, the MPAs and HA already have a security association such that HoT/i/CoT/i/message sequence is not needed. In addition, the HA is in an ideal position to detect traffic that could benefit from route optimization. Furthermore, the HA could use the mobility binding update messages to remove previous binding updates due to subsequent mobility events.

The use of network controlled mobility and route optimization is an area that is receiving a lot of attention with the next generation architectures.

FIG. 1 depicts an embodiment according to the present apparatus. In this embodiment a base station routing architecture network 102 may have BSRs 104 and 106 and LMAPs (Local Multimedia Access Platform) such as LMAP 108. It is to be understood that the use of the term LMAP as used herein refers to the LMAP being an HA. A mobile terminal 105 (also referred to as a mobile station, mobile, cell phone, etc.) may be operatively coupled to the BSR 104, and a mobile terminal 107 may be operatively coupled to the BSR 106. The BSR 104 may communicate with the LMAP 108 along route 120 using RFC3775 signaling messages 110, and the BSR 106 may communicate with the LMAP 108 along route 122 using RFC3775 signaling messages 112.

The embodiments of the present method and apparatus establish a direct route 214 between the BSRs 104, 106 using RFC3775 signaling messages 114. A binding update procedure establishes a direct routing path between the BSRs 104, 106 eliminating the need to tunnel all traffic through the LMAP 108. Thus, the route 114 is an optimized data path for mobile-to-mobile communications between the mobile terminal 105 and the mobile terminal 107.

Figure 2:
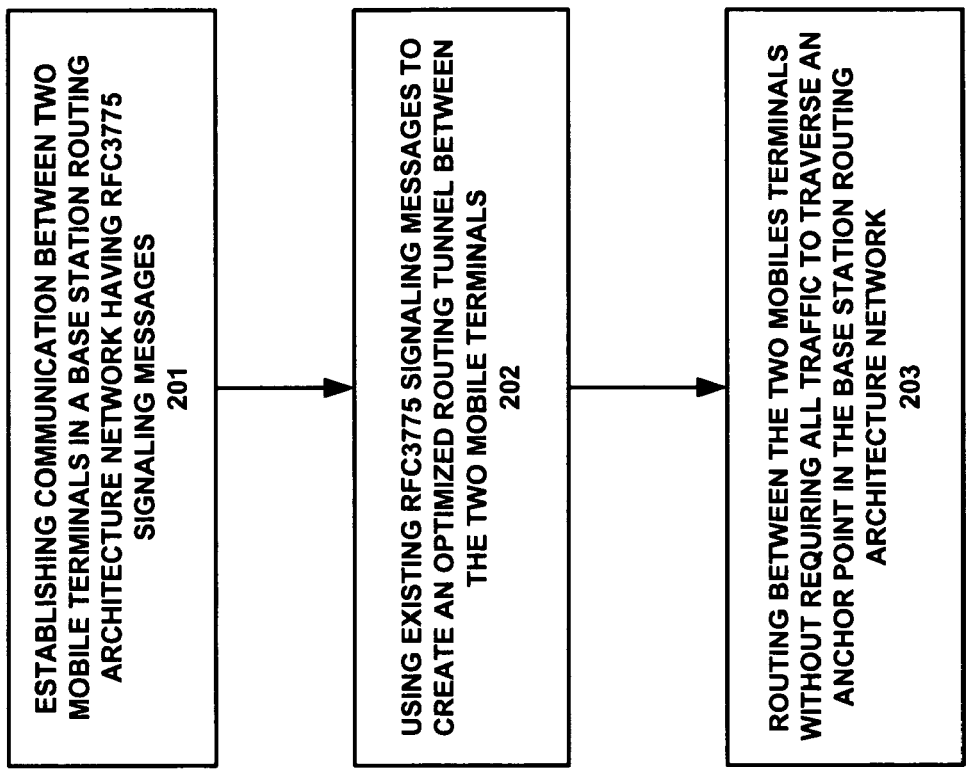
FIG. 2 is an embodiment of a flow diagram according to the present method.

FIG. 2 is a representation of a flow diagram according to the present method for providing an optimized data path for VoIP mobile-to-mobile calls in a BSR architecture. One embodiment of the present method may have the steps of: establishing communication between two mobile terminals in a base station routing architecture network having RFC3775 signaling messages (201); using existing RFC3775 signaling messages to create an optimized routing tunnel between the two mobile terminals (202); and routing between the two mobile terminals without requiring all traffic to traverse an anchor point in the base station routing architecture network (203).

The present apparatus in one example may comprise a plurality of components such as one or more of electronic components, hardware components, and computer software components. A number of such components may be combined or divided in the apparatus.

The present apparatus may employ at least one computer-readable signal-bearing media that may store software, firmware and/or assembly language, etc. The computer-readable signal-bearing medium may comprise magnetic, electrical, optical, biological, and/or atomic data storage mediums. For example, the computer-readable signal-bearing medium may comprise floppy disks, magnetic tapes, CD-ROMs, DVD-ROMs, hard disk drives, and electronic memories, etc. The computer-readable signal-bearing medium may also comprise a modulated carrier signal transmitted over a network comprising or coupled with the apparatus, for instance, at least one of a telephone network, a local area network ("LAN"), a wide area network ("WAN"), the Internet, and a wireless network. Although the term "binding update" has been used in the present description, it is to be understood that this term also refers in general to an address binding message which may include the "binding update" in its scope. One embodiment of the present method and apparatus is depicted with elements identified with terms such as BSR. It is to be understood that these terms include IP gateway (IPGW), and IP BTS. The use of the term Flat-IP is also tied to the use of these terms and refers to networks where there is a single element in the network that is access specific (UMTS, cdma2000, WiMAX etc.) versus a hierarchy of elements (perhaps a separate element for each layer (physical, link layer, IP layer)). One embodiment of the present method and apparatus is depicted that is specific to UMTS. However, the present method and apparatus may be used in other systems, such as, cdma2000.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

We claim:

1. A method, comprising:
    detecting, via a home agent (HA) in a base station routing architecture network, intra-HA traffic;
    detecting an inter-Local Multimedia Access Platform (LMAP) packet by LMAPs when the LMAPs know each other's network prefix;
    initiating, via the HA, a binding procedure to establish a direct routing path between mobile points of attachment for at least two mobiles terminals to eliminate tunneling of all traffic through the HA;
    wherein the HA comprises a first HA and a second HA;
    detecting, via the first HA, one of a mobile node 1 (MN1) to mobile node 2 (MN2) packet and a MN2 to a MN1 packet;
    sending, via the first HA, a binding update to the second HA to give the second HA an address of a base station router 1 (BSR1) for the MN1; and
    sending, via the second HA, a binding update to a base station router 2 (BSR2) to give the BSR2 the address of the BSR1 for the MN1.

2. The method according to claim 1, further comprising using existing RFC3775 signaling messages to create an optimized routing tunnel between the two mobile terminals.

3. The method according to claim 2, further comprising removing the tunnel due to movement of at least one of the two mobile terminals.

4. The method according to claim 1, wherein the mobile points of attachment are base station routers (BSRs), and wherein the method further comprises the HA detecting one of the MN1 to MN2 packet and the MN2 to MN1 packet, the HA sending a binding update to the BSR1 to give the BSR1 address of the BSR2 for the MN2, and the HA sending a binding update to the BSR2 to give a BSR2 address of the BSR1 for the MN1.

5. The method according to claim 1, wherein the first HA sends a binding update to the second HA to give the second HA address of the BSR2 for the MN2, and wherein the second HA sends a binding update to the BSR1 to give the BSR1 address of the BSR2 for the MN2.

6. An apparatus, comprising:
    a specialized home agent (HA) in a base station routing architecture network configured to
    detect intra-specialized HA traffic;
    detect an inter-specialized HA packet via specialized HAs when the specialized HAs know each other's network prefix;
    initiate a binding update procedure to establish a direct routing path between mobile points of attachment for at least two mobiles terminals to eliminate tunneling of all traffic through the specialized HA;
    detect one of a mobile node 1 (MN1) to mobile node 2 (MN2) packet and a MN2 to a MN1 packet;
    send a binding update to a base station router 1 (BSR1) to give a BSR1 address of a base station router 2 (BSR2) for the MN2; and
    send a binding update to the BSR2 to give a BSR2 address of the BSR1 for the MN1.

7. The apparatus according to claim 6, wherein the base station routing architecture network has RFC3775 signaling messages, and wherein the apparatus further comprises a module to create an optimized routing tunnel between the two mobile terminals.

8. The apparatus according to claim 7, wherein the tunnel is removed due to movement of at least one of the two mobile terminals.

9. The apparatus according to claim 6, wherein the mobile points of attachment are base station routers.

10. The apparatus according to claim 6, wherein the specialized HA comprises specialized first HAs and specialized second HAs, and when the specialized first HAs and the specialized second HAs know each other's network prefix, a respective specialized first HA and a respective specialized second HA are configured to detect an inter-specialized HA packet, and wherein the specialized first HA is configured to detect one of the MN1 to MN2 packet and the MN2 to MN1 packet, and wherein the specialized first HA is configured to send a binding update to the specialized second HA to give a specialized second HA address of the BSR1 for the MN1, and wherein the specialized second HA is configured to send a binding update to the BSR2 to give a BSR2 address of the BSR1 for the MN1.

11. A method, comprising:
- detecting, via a specialized home agent (HA) in a base station routing architecture network, intra-specialized HA traffic;
- detecting an inter-specialized HA packet via specialized HAs when the specialized HAs know each other's network prefix;
- using RFC3775 signaling messages, via the specialized HA, to initiate a binding procedure to establish a direct routing path between mobile points of attachment for at least two mobiles terminals to eliminate tunneling of all traffic through the specialized HA;
- detecting, via the specialized HA, one of a mobile node 1 (MN1) to mobile node 2 (MN2) packet and a MN2 to MN1 packet;
- sending, via the specialized HA, a binding update to a base station router 1 (BSR1) to give a BSR1 address of a base station router 2 (BSR2) for the MN2; and
- sending, via the specialized HA, a binding update to the BSR2 to give a BSR2 address of the BSR1 for the MN1.

12. The method according to claim 11, further comprising removing the direct routing path due to movement of at least one of the two mobile terminals.

13. The method according to claim 11, wherein the mobile points of attachment are base station routers, and wherein the specialized HA comprises a specialized first HA and a specialized second HA, and wherein the specialized first HA detects one of the MN1 to MN2 packet and the MN2 to MN1 packet, and wherein the specialized first HA sends a binding update to the specialized second HA to give a specialized second HA address of the BSR1 for the MN1, and wherein the specialized second HA sends a binding update to the BSR2 to give a BSR2 address of the BSR1 for the MN1.

14. The method according to claim 13, wherein the specialized first HA sends a binding update to the specialized second HA to give the specialized second HA address of the BSR2 for the MN2, and wherein the specialized second HA sends a binding update to the BSR1 to give a BSR1 address of the BSR2 for the MN2.

* * * * *